US005213284A

United States Patent [19]
Webster

[11] Patent Number: 5,213,284
[45] Date of Patent: May 25, 1993

[54] DISC PLANFORM AIRCRAFT HAVING VERTICAL FLIGHT CAPABILITY

[76] Inventor: Steven N. Webster, P.O. Box 426 Sleepy Hollow, Long Creek, Mossy Head, Fla. 32434

[21] Appl. No.: 772,904

[22] Filed: Aug. 5, 1991

Related U.S. Application Data

[63] Continuation-in-part of Ser. No. 395,358, Aug. 17, 1989, abandoned.

[51] Int. Cl.$^5$ .............................................. B64C 29/00
[52] U.S. Cl. .................................. 244/23 C; 244/12.2
[58] Field of Search ............... 244/23 C, 12.2, 23 B, 244/53 R, 60, 17.19

[56] References Cited

U.S. PATENT DOCUMENTS

| | | | |
|---|---|---|---|
| 2,863,621 | 12/1958 | Davis | 244/23 C |
| 2,935,275 | 5/1960 | Grayson | 244/23 C |
| 3,312,425 | 4/1967 | Lennon et al. | 244/12.2 |
| 3,774,865 | 11/1973 | Pinto | 244/23 C |
| 4,014,483 | 3/1977 | MacNeill | 244/23 C |
| 5,039,031 | 8/1991 | Valverde | 244/12.2 |

FOREIGN PATENT DOCUMENTS

| | | | |
|---|---|---|---|
| 0678700 | 1/1964 | Canada | 244/23 C |
| 2648504 | 2/1978 | Fed. Rep. of Germany | 244/23 C |

*Primary Examiner*—Joseph F. Peters, Jr.
*Assistant Examiner*—Christopher P. Ellis
*Attorney, Agent, or Firm*—Richard C. Litman

[57] ABSTRACT

An aircraft having a generally circular or disc planform configuration provides the capability of vertical flight through two concentric sets of lifting fans or blades. The two sets may each include a number of individual rings of blades, but both sets are equal in area and rotate oppositely in order to provide nearly equal volumes of airflow, and thus essentially offset any torque reaction due to the rotation of the blade sets. Several engines are provided in the preferred embodiment, with one engine providing power to the lift fan sets and other engines providing thrust for horizontal flight. Other novel features are also disclosed, such as a peripheral aerodynamic control system, power transmission system, and surface vane system. An alternate embodiment includes a peripheral passenger or cargo area, with more conventional rearwardly located aerodynamic controls for horizontal flight.

15 Claims, 5 Drawing Sheets

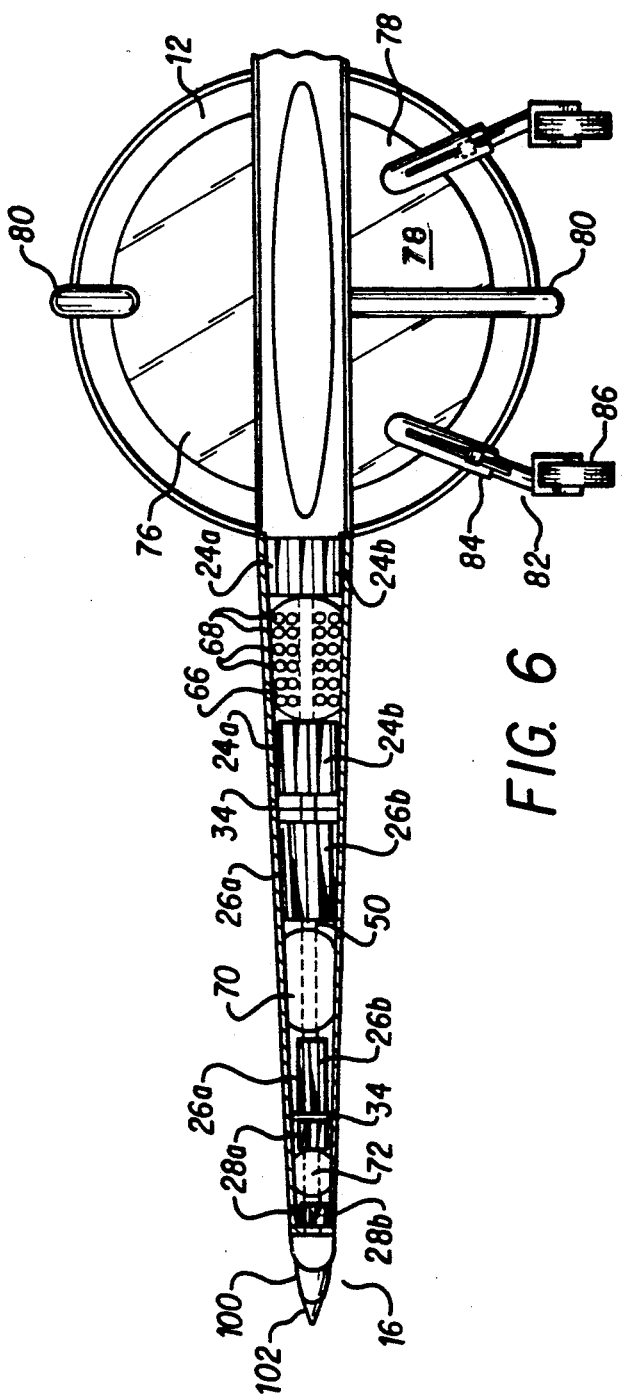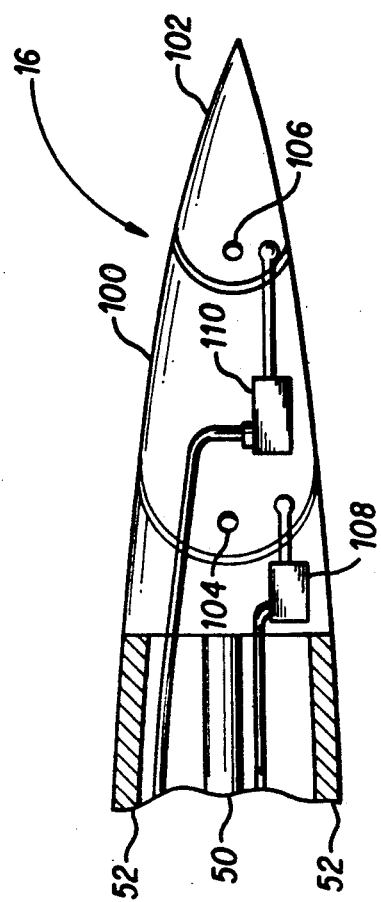

DISC PLANFORM AIRCRAFT HAVING VERTICAL FLIGHT CAPABILITY

REFERENCE TO RELATED APPLICATION

This application is a continuation in part of utility patent application Ser. No. 07/395,358 filed on Aug. 17, 1989, now abandoned.

FIELD OF THE INVENTION

This invention relates generally to aircraft, and more specifically to an aircraft type having a plurality of concentric, counterrotating lifting fans or blades and the capability of vertical takeoff and landing, as well as other novel features.

BACKGROUND OF THE INVENTION

The development of heavier than air powered aircraft (i.e., airplanes, gyroplanes and helicopters) has led to a variety of different aircraft configurations, control systems, and powerplant, propeller and/or other systems and configurations. Most of these various configurations require some horizontal distance for takeoff and landing, thus restricting their use to specific airport or at least open areas not otherwise restricted. Even in the case of helicopters, where vertical takeoffs and landings are physically possible, the relative hazard due to the rapidly spinning, large diameter rotor blades generally precludes their use in any but specially designated areas, except for specialized emergency uses such as air ambulance service and the like. Moreover, the disastrous effects which would occur if a helicopter main or tail rotor blade were to strike a fixed object while taking off or landing in a confined area, result in most helicopter operations being restricted to airports just as are operations with fixed wing aircraft.

The need arises for an aircraft which is capable of vertical takeoffs and landings, while also being capable of relatively high speed flight. The aircraft lifting rotors, fans and/or blades must be completely contained within the fixed structure of the craft, in order to permit the safe operation of the craft within confined areas. In order that the craft operate efficiently at various airspeeds ranging from zero to maximum cruise or above, both aerodynamic and thrust control systems should be implemented. Torque may be eliminated by means of counterrotating lift devices, rather than anti torque tail rotors as in helicopters, thus further enhancing the safety of the craft. Finally, the craft should employ a relatively simple powerplant system which is capable of providing both thrust for horizontal flight and a lifting force for vertical flight, by means of appropriate lift fan technology.

DESCRIPTION OF THE RELATED ART

Grayson U.S. Pat. No. 2,935,275 discloses a disc shaped aircraft which contains a general powerplant and lifting fan configuration similar to a limited extent to that of the present invention. However, it does not appear that the patent to Grayson makes provision for yaw control in the craft. Other deficiencies will be noted in comparison to the disclosure of the present invention as described further below.

J. C. M. Frost et al. U.S. Pat. Nos. 3,022,963 and 3,051,417 each disclose a disc type aircraft including a peripheral control system. The control systems rely primarily on the well known Coanda effect, which may have limited use in maneuvering a relatively large and heavy craft in all flight conditions.

P. B. Clover U.S. Pat. No. 3,243,146 discloses a vertical takeoff and landing aircraft with lifting power supplied by a single rotor or fan. Anti torque means are provided by a series of vanes within the craft which guide incoming air to the fan. The control system is completely aerodynamic (as opposed to reaction control means), but comprises generally horizontal control surfaces disposed completely within the entry air ducts of the craft. As the air mass must be contained within the respective ducts and cannot be deflected due to the duct walls, it is not seen how the control system of the Clover patent operates.

J. N. Modesti U.S. Pat. No. 3,503,573 discloses a disk shaped aircraft which is powered by rocket engines. Nearly the entire craft is spun by means of tangentially thrusting rockets, while means are provided for counterrotating the cockpit or cabin of the craft to produce a net rotational velocity which approaches zero for the cabin structure. However, no purpose for the rotation of the main portion of the craft appears to be disclosed in the Modesti patent.

J. A. Perseghetti U.S. Pat. No. 3,531,063 discloses a vertical takeoff aircraft and gyro guidance system therefor. Vertical thrust is provided by four jet engines, while the control system is by means of the gyroscopic precessional forces. Such a control system would by its nature require relatively heavy gyro assemblies, which in turn would necessitate relatively large and heavy engines to lift the weight of the craft.

U.S. Pat. Nos. 3,997,131 and 4,147,472 issued to A. Kling respectively disclose an electrically operated rotor system for aircraft and an annular shroud arrangement for rotating turbine blades.

DeSautel U.S. Pat. No. 4,214,720 discloses a disc shaped aircraft powered by sixteen jet engines arranged radially about the craft. The engines create a lifting force by directing their thrust around an annular airfoil shaped periphery. The annular periphery is also rotated, as in the patent to Modesti described above. Many of the same limitations of the Modesti patent are apparent here.

Finally, P. M. Panos U.S. Pat. No. 4,901,948 discloses a control system for a disc shaped aircraft comprising a plurality of rotatable nozzles, each of which may be rotated in its respective housing in order to direct thrust in a specific direction. This system is similar to reaction control systems known in other specialized aircraft applications, such as the Hawker Harrier aircraft series. The system bears no resemblance to the control system of the present invention.

None of the above noted patents, either singly or in combination, are seen to disclose the specific arrangement of concepts disclosed by the present invention.

SUMMARY OF THE INVENTION

By the present invention, an improved aircraft having concentric, counterrotating lifting fans and being capable of vertical flight is disclosed.

Accordingly, one of the objects of the present invention is to provide such an improved aircraft having a generally circular planform.

Another of the objects of the present invention is to provide an improved aircraft in which each of the counterrotating lifting fans or groups of counterrotating lifting fans are of equal areas.

Yet another of the objects of the present invention is to provide an improved aircraft in which the lifting fans are powered by means of turbine engines, which engines further provide thrust for horizontal flight.

Still another of the objects of the present invention is to provide an improved aircraft having an efficient and lightweight structure which combines cooperating elements which are arranged in tension and compression.

A further object of the present invention is to provide an improved aircraft having both a control system providing control at low airspeeds, and an aerodynamic control system for use at higher airspeeds.

An additional object of the present invention is to provide an improved aircraft of generally circular planform, which provides for passenger and/or cargo carriage both in a central area and further in a peripheral area of the craft.

With these and other objects in view which will more readily appear as the nature of the invention is better understood, the invention consists in the novel combination and arrangement of parts hereinafter more fully described, illustrated and claimed with reference being made to the attached drawings.

BRIEF DESCRIPTION OF THE DRAWINGS

FIG. 6 is a front view of a portion of the craft, partially cut away, showing various internal components and systems of the lifting surface.

FIG. 8 is a view in section of the aerodynamic controls of the craft, showing the detail of the hinge arrangement.

Similar reference characters designate corresponding parts throughout the several figures of the drawings.

DESCRIPTION OF THE PREFERRED EMBODIMENT

Figure 1:
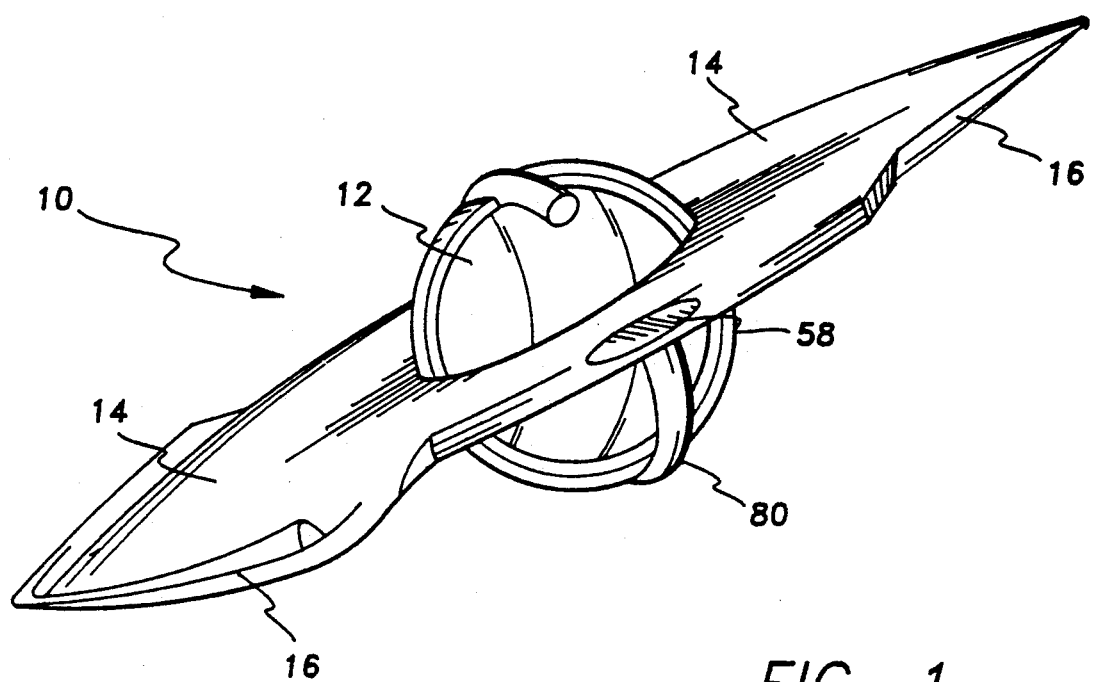
FIG. 1 is a front perspective view of the aircraft of the present invention, showing its general configuration.

Referring now to the drawings, particularly FIG. 1 of the drawings, the present invention will be seen to relate to an aircraft 10 of generally circular or disc shaped planform. The embodiment of aircraft 10 shown in FIG. 1 may be seen to generally comprise a central, generally spherical compartment 12 which is surrounded by a generally circular area or lifting surface 14 which provides means for supporting the craft 10 in flight. Aerodynamic control surfaces, generally indicated as 16, are disposed around the periphery of surface 14.

Figure 2:
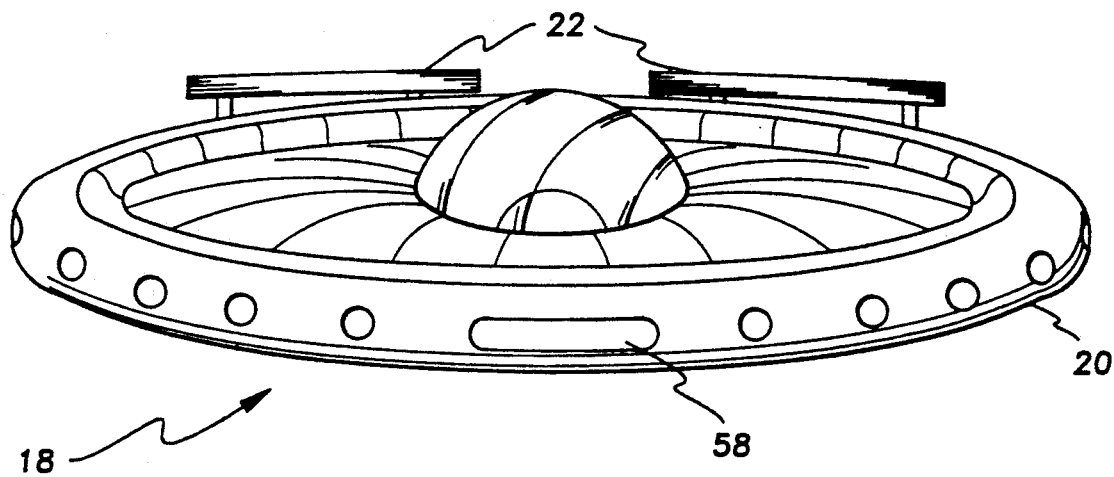
FIG. 2 is a perspective view of an alternative configuration having a peripheral passenger and/or cargo compartment.

FIG. 2 discloses an alternate embodiment 18 of the aircraft 10 of FIG. 1, in which the general configuration of aircraft 10 is constructed to a larger scale which enables an additional peripheral passenger or cargo compartment 20 to replace the aerodynamic control surfaces 16 of aircraft 10. In lieu of peripheral aerodynamic control surfaces 16, separate trailing control surfaces 22 are used near the rear of craft 18 as shown in FIG. 2. Most of the remaining systems of the two embodiments 10 and 18 are common to the two aircraft, differing only in scale and various details as required by the structure of each aircraft 10 and 18. These remaining systems will be discussed in detail below in a discussion of the elements of the remaining figures.

Figure 3:
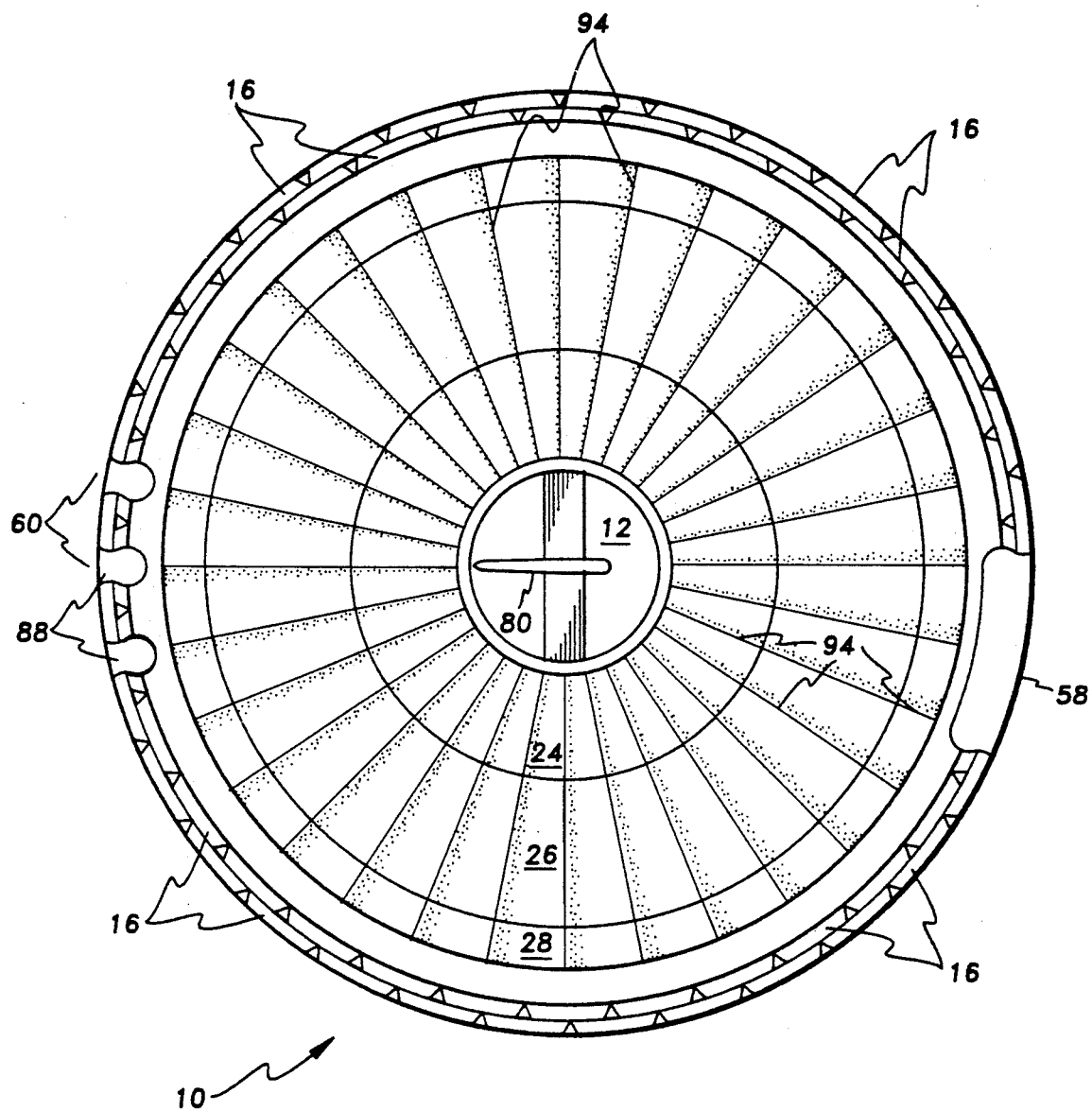
FIG. 3 is a top plan view of the craft showing the general arrangement of the lifting fans, engine intake and exhaust, central cabin area, and peripheral aerodynamic controls.

FIG. 3 discloses a plan view of the aircraft 10 shown in FIG. 1. Before discussing in detail the arrangement shown in FIG. 3, it is important to note that the control of torque reactions in vertical flight aircraft is of critical importance. In this respect, the aircraft 10 and 18 of FIGS. 1 and 2 respectively have some common ground with helicopters. As the rotor of a helicopter rotates and develops a lifting force, a horizontal drag force will also be developed. Assuming that the helicopter is clear of the surface, and thus is free to move or rotate about any axis, the helicopter itself will tend to rotate in a direction opposite that of the direction of rotation of the main rotor.

Various solutions have been developed to overcome this torque reaction, the most common being an anti torque rotor installed on the tail of the helicopter. Multiple main rotor systems rotating in opposite directions are also seen in larger helicopters, the torque reaction of the two counterrotating main rotors thus canceling out. In any case, some provision must be made for the cancellation of torque reaction in aircraft capable of vertical flight, which obviously involves at least some flight at airspeeds too low for conventional aerodynamic controls to be effective.

The aircraft of embodiments 10 and 18, as shown in FIGS. 1 and 2 respectively, respond to this problem by means of a plurality of counterrotating lifting fan sets, designated as 24, 26 and 28 in FIG. 3. These fan sets 24, 26 and 28 each appear as a single fan in the top view shown in FIG. 3, but the cross sectional view of FIG. 6 discloses each fan set 24, 26 and 28 to comprise respectively an upper fan 24a, 26a, and 28a, and lower fan 24b, 26b and 28b. While three lifting fan sets, comprised of an inner lift fan set 24, central lift fan set 26, and outer lift fan set 28, are shown in FIG. 3, it will be understood that virtually any number of fans more than one could be constructed in this manner and caused to rotate in opposite directions in order to cancel any torque reaction. The critical point is that the mass and velocity of air moved by the fan or fans rotating in one direction must be very nearly the same as the mass and velocity of air moved by the fan or fans rotating in the opposite direction. If the air mass and velocity moved by each set of counterrotating fans is essentially equal, by definition the resulting lift force will be essentially equal and therefore the resulting drag force will also be essentially equal and any torque reaction will be all but canceled.

This is basically accomplished in the present invention by making the areas of each set of counterrotating fans equal. In other words, the areas of inner fan set 24 and outer fan set 28, which rotate in one direction, when added together are equal in area to that of central fan set 26 which rotates in a direction opposite to that of inner and outer fan sets 24 and 28. While other factors are of course involved in the amount of lift produced by a given lift fan set 24, 26, or 28, such as the blade pitch and therefore angle of attack, as well as rotational speed, these factors may be adjusted accordingly in the construction of aircraft 10 or 18.

Figure 7:
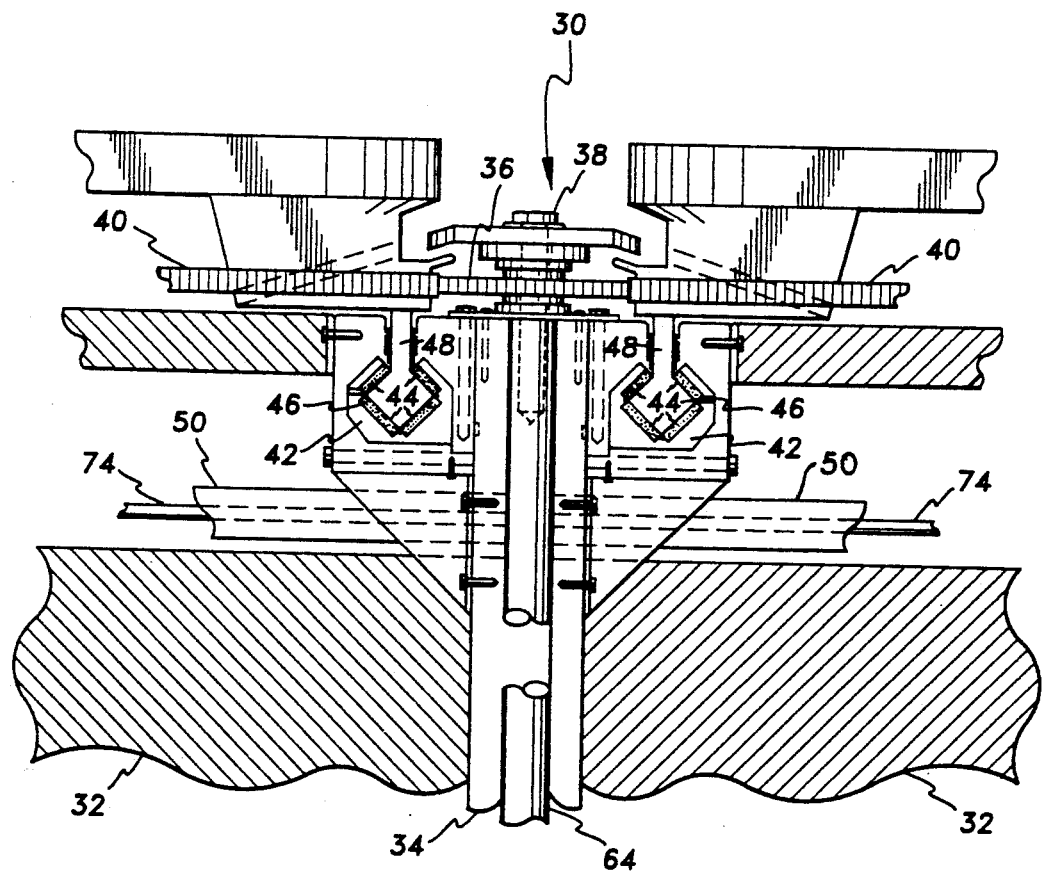
FIG. 7 is a view in section of the mechanism providing for the rotation of the lifting fans.

One means of accomplishing such adjustment is by means of the gearing used to drive lift fan sets 24 through 28, as shown more clearly in FIG. 7. By adjusting the gear ratio as desired, rotational speed of any one of the fan sets 24 through 28 may be adjusted accordingly, thus serving to equalize the lifting force and corresponding torque developed by any one of the fan sets 24 through 28. Alternatively, one set of fans 24, 26 or 28 may be equipped with variable pitch blades, not shown, and adjusted by means of controls in the cabin 12 of the aircraft 10 or 18 as is well known in the helicopter art. Only one set of fans 24, 26 or 28 need be so equipped, as when the pitch is adjusted on any one set of fan blades, the lift and therefore drag and torque may be made to be either greater than, equal to, or less than any other fan or set of fans.

The cross sectional view of FIG. 6 more clearly shows the vertical arrangement of the lifting fans 24a and b, 26a and b, and 28a and b, as well as other interior structural components described further below. In FIG. 6, the upper fans 24a, 26a, and 28a and lower fans 24b, 26b, and 28b may be seen. It will be noted that the blades of both upper and lower inner fans 24a and 24b are angled or pitched in the same relative direction, as they are both geared together and turn in the same direction. In a like manner, upper and lower central fans 26a and 26b are both geared together and revolve in the same direction relative to one another, although that direction of rotation is opposite that of inner fan set 24 and outer fan set 28. Similarly, upper and lower outer fans 28a and 28b are geared together in order to revolve in the same direction relative to one another and relative to inner fan set 24, while opposite the rotational direction of central fan set 26.

FIG. 7 discloses details of the drive mechanism 30 for fan sets 24, 26 and 28. It will be understood that FIG. 7 shows only the fan drive mechanism 30 for an upper set of lift fans 24a, 26a, or 28a, but that the drive mechanism for lower lift fans is essentially a mirror image in the vertical of the fan drive mechanism 30 shown in FIG. 7. Adjacent upper and lower drive mechanisms 30 each receive power input by means of a vertical shaft 64, which shafts 64 receive power from cooperating power output shafts 62 further described below.

Figure 4:
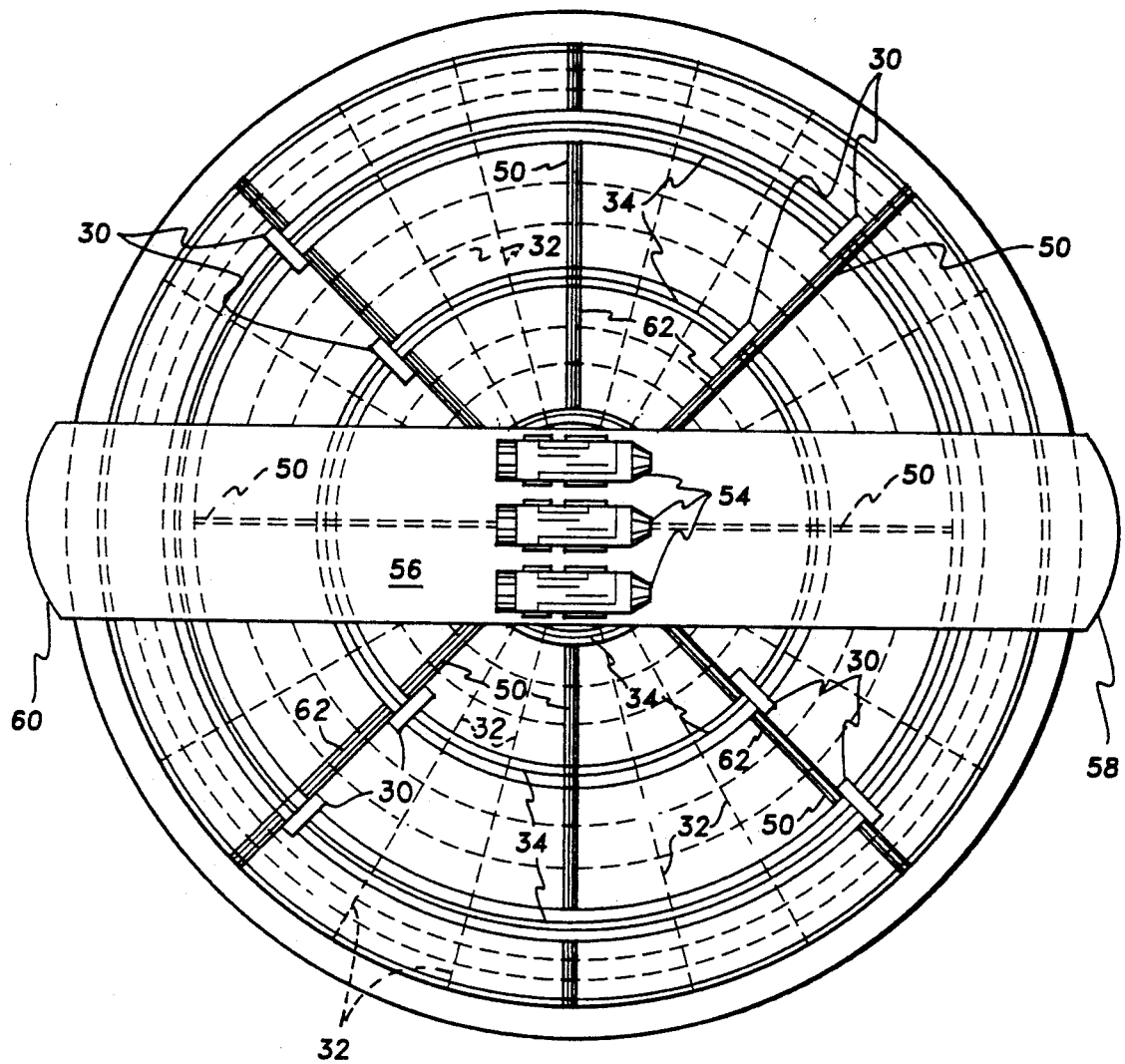
FIG. 4 is a top plan view in which the upper surface of the craft has been removed in order to more clearly show the internal structure and components.

It will also be seen that FIG. 7 discloses an essentially symmetrical arrangement, as would be required for the fan drive mechanism between adjacent lifting fan sets 24 and 26 or 26 and 28. Four fan drive mechanisms 30 are installed between upper inner lifting fan 24a and upper central lifting fan 26a, at locations 45 degrees from the longitudinal and lateral axes of aircraft 10 as shown in FIG. 4. In a like manner, an additional four fan drive mechanisms are positioned between upper central lift fan 26a and upper outer lift fan 28a, for a total of eight fan drive mechanisms 30 to drive the upper lift fans 24a, 26a and 28a. A symmetrical arrangement of eight more drive mechanisms 30 are located within the lower portion of lifting surface 14 immediately below mechanisms 30 which drive upper fans 24a, 26a, and 28a, to drive the lower lift fans 24b, 26b and 28b. Thus, there are a total of sixteen lift fan drive mechanisms 30 to drive lift fan sets 24, 26 and 28 in the aircraft configuration generally described in this specification.

Support webs 32 provide for the attachment and securing of each fan drive mechanism 30 within lifting surface 14; many of these structural components may also be seen in FIG. 4. Support webs 32 extend radially outward from the central vertical axis of aircraft 10. For additional support, vertical circumferential walls 34 are located between inner and central fan sets 24 and 26 and between central and outer fan sets 26 and 28. The joint formed at the juncture of radial support webs 32 and circumferential walls 34 at the locations of drive mechanisms 30 provide the required structural strength for the installation of those drive mechanisms 30.

Each drive mechanism 30 is comprised of a pinion gear 36 which is secured to circumferential wall 34 by means of a bolt 38 or other suitable securing means. Pinion gear 36 in turn drives lift fan ring gears 40, which are secured to the adjacent peripheries of related lift fans 24a and b, 26a and b, and 28a and b.

Support bearings 42 are provided at the periphery of each lift fan 24a and b, 26a and b, and 28a and b. Bearings 42 may be formed in an angular rectangular or diamond pattern, as shown, or in some other suitable form. In any case, bearings 42 must contain and provide support for lift fans 24a and b, 26a and b, and 28a and b throughout any anticipated conditions which might induce a load upon bearings 42, hence the system of roller bearings 44 comprising each support bearing 42 which generally surround annular lift fan guides 46 in order to prevent the movement of such guides 46, and the fans 24a and b, 26a and b, and 28a and b to which guides 46 are attached by means of annular fan guide attachments 48, in any but a horizontal plane of rotation about the vertical axis of aircraft 10.

Further structural details of aircraft 10 may be seen in FIGS. 4 and 6. It is generally recognized that one of the strongest and lightest structural arrangements for a circular structure is a combination of support elements in tension and compression; this is the general arrangement used in the structure of aircraft 10. A plurality of radial compression ribs 50 in the central horizontal plane of aircraft 10 are positioned each 45 degrees around the vertical axis of aircraft 10. Each of these compression ribs 50 is of a generally tubular form with a hollow interior in order to provide for the containment of electrical wiring, hydraulic, fuel and other lines, etc. Additional rigidity of the structure is provided by upper and lower radial tension spokes 52, which lie in the same vertical planes as compression ribs 50. Each of these elements 50 and 52 is secured to the circumferential walls 34, support webs 32 and other structure as required to form a sturdy and rigid but relatively light-weight structure.

Power for aircraft 10 is supplied by one or more turbine or other suitable engines 54. In the preferred embodiment disclosed herein, three turboshaft engines 54 are located near the center of aircraft 10 as indicated in FIG. 4. A surrounding housing 56 within the center of aircraft 10 contains engines 54 and extends forward to an intake 58 and rearward to an exhaust outlet 60. While FIG. 4 discloses the general arrangement of the above power system, it is understood that structural and other components, such as central compartment 12 and some radial compression and tension ribs 50 and 52, will also be located in the immediate area occupied by engines 54 and housing 56. These components have generally been deleted from the engine housing 56 and intake and exhaust areas 58 and 60 in FIG. 4 for greater clarity.

At least one engine 54 is mechanically coupled to each of the drive mechanisms 30 by means of reduction gearing or a transmission, not shown, similar to that known in the art of helicopter turbine powerplants and reduction gearing or transmissions for driving the rotor blades of such helicopters. A plurality of power output shafts 62 extend from such a turboshaft transmission to drive each of the lift fan drive mechanisms 30 discussed above. Output shafts 62 are each contained within a radial compression rib 50, and provide for transmission of power from engines 54 and other transmission means, to vertical shafts 64 and thence to each of the drive mechanisms 30.

Radial compression ribs 50 may also contain additional wiring, conduits, etc. for the transmission of electrical, hydraulic, and other energy or fluids, as noted above. For example, FIG. 6 discloses a coolant reservoir or system 66 comprising a plurality of coils or tubes 68, a fuel storage tank 70, and oil storage tank 72. It will be understood that each of these tanks or reservoirs 66, 70 and 72 are of generally concentric annular form, passing completely around the center of craft 10 to form a series of generally ring shaped reservoirs or tanks 66, 70 and 72. FIG. 6 discloses these tanks 66, 70 and 72 as a cross section through the interior of lifting surface 14. Tubular compression ribs 50 provide space for the passage of the various fluid lines from these tanks or reservoirs 66, 70 and 72 to the appropriate locations, such as oil line 74 to fan support bearings 42 as shown in FIG. 7.

Engine and flight controls for these various systems are conventionally located within central compartment 12, which provides space for a flight crew as well as some passengers and/or cargo. Central compartment 12 comprises an upper portion 76 and a lower portion 78 and is generally surrounded by a combination safety or rollover structure and aerodynamic surface 80. The lower portion 78 of central compartment 12 provides space for the retraction mechanism and retracted storage of landing gear 82, as well as space for additional components and/or payload. Landing gear 82 is comprised of a plurality of individual landing gear struts 84, each of which may be equipped with conventional tires 86 or other supportive means. It will be appreciated that due to the vertical takeoff and landing capability of aircraft 10, tires 86 or other means permitting aircraft 10 to move horizontally along a surface are not necessarily required. A simpler and lighter footpad or other suitable means, not shown, may also be installed at the lower end of each strut 84, as desired.

Aircraft 10 may be operated by an appropriately trained flight crew by starting the engines 54 and engaging and operating the appropriate engine and flight controls. One or more of the engines 54 will drive upper and lower lifting fans 24, 26 and 28 by means of drive mechanisms 30 and power output shafts 62, as described above. Due to the equal areas of the counterrotating lift fans, little or no torque reaction will occur. By increasing the speed of upper and lower lift fans 24, 26 and 28, sufficient vertical thrust may be achieved to overcome the weight of aircraft 10 and any additional load aboard, and vertical flight will occur.

It will be evident that at very low or zero airspeed, conventional aerodynamic flight controls will not be operable. Aircraft 10 provides for controllability at such very low airspeeds by means of a cyclic pitch control system in which the pitch of at least one set of lift fan blades 24, 26 or 28 may be varied over some portion of their rotational arc in order to increase or reduce the lifting force in some area of the lifting surface 14 and thus maintain control. It is envisioned that this cyclic pitch control be along similar lines to that already well known and used for the cyclic control of helicopter rotor blades.

Figure 5:
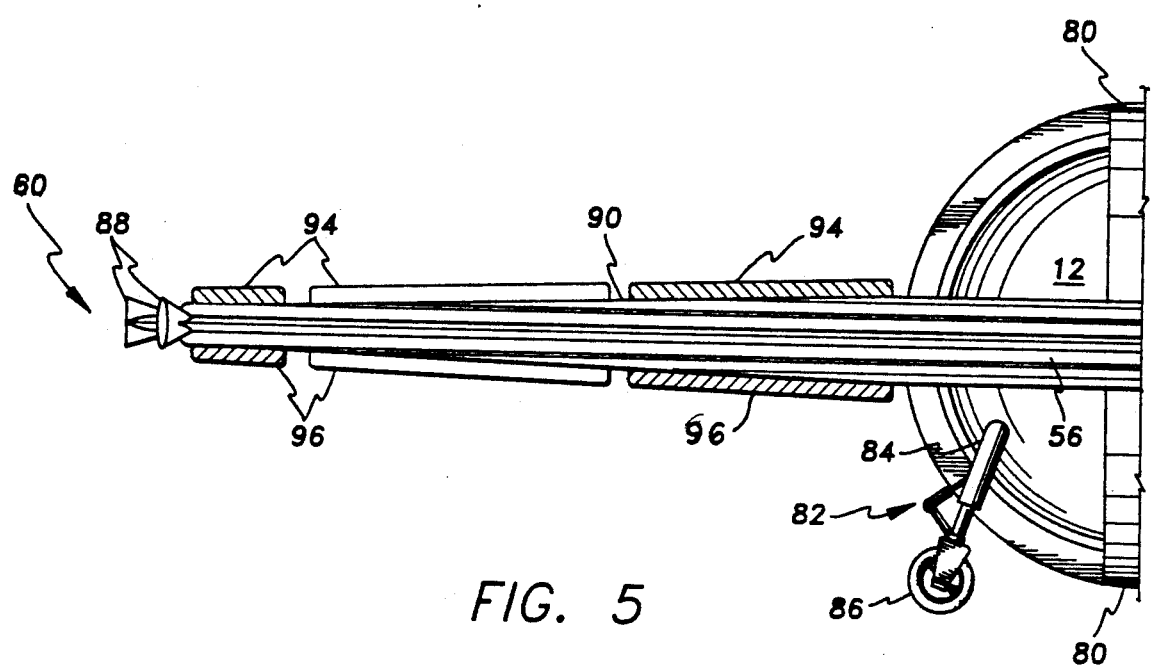
FIG. 5 is a side view of a portion of the craft, showing additional details relating to the power system and other areas.

The present aircraft 10 provides for a plurality of engines 54, one or more of which may be used for the transmission of power to upper and lower lift fan blades 24, 26 and 28 as described above. The remaining engines are provided for the purpose of forward thrust for horizontal flight, as provided by engine housing 56 and exhaust outlet 60 as shown in FIG. 4 and 5. Exhaust outlet 60 may be equipped with thrust vectoring nozzles 88 for further control of aircraft 10.

It will be appreciated that as the appropriate flight controls are manipulated to translate aircraft 10 from vertical to horizontal flight, that airflow over lifting surface 14 may be utilized for the production of dynamic lift. This is advantageous, as less energy is thus required by the engine or engines 54 used to provide power for lift fans 24, 26 and 28. However, in order to provide for such dynamic lift over surface 14, the upper and lower surfaces 90 and 92 must be closed in order to prevent airflow from the relatively high pressure beneath lower surface 92 through lifting surface 14, to the relatively low pressure above upper surface 90 which will naturally occur as a result of the production of dynamic lift. This is accomplished by means of upper and lower vanes 94 and 96 as shown in FIG. 5, which may be actuated by means of pilot operable controls within the central compartment 12. Thus, as translation is made from vertical to horizontal flight, power to lift fans 24, 26 and 28 may be gradually reduced and upper and lower vanes 94 and 96 may be gradually closed to present a uniform, unbroken surface to such horizontal airflow as will occur in horizontal flight in order to produce dynamic lift over the airfoil shape of lifting surface 14.

It will be appreciated that the equal areas of counterrotating lift fans 24, 26 and 28 may not provide for precisely balanced thrust levels, and that accordingly there may be some slight net torque reaction which will tend to cause aircraft 10 to yaw or rotate about its vertical axis while hovering or operating at very low airspeeds. Upper and lower vanes 94 and 96 may be further utilized during this portion of flight by partial deflection, thus causing some sideward reaction of the air exiting the lower lift surface 92 and thereby producing such antitorque thrust as may be required. As greater airspeed is gained, such torque reactions will be reduced as power is reduced to lift fans 24, 26 and 28 and the lift necessary to support aircraft 10 in flight is provided by aerodynamic means by lifting surface 14 as described above.

At airspeeds conductive to aerodynamic lift, it will be appreciated that aerodynamic control means will prove more desirable than the reaction control provided by the deflection of upper and lower vanes 94 and 96. Thus, aerodynamic control is provided by means of peripheral flaps 98. It is to be understood that as aircraft 10 is not by any means a conventional aircraft, some of the terms used in this specification do not necessarily directly relate to those used in conventional aircraft. In this instance, the term "flap" as used with conventional aircraft is generally accepted to mean an aerodynamic device located on the trailing edge of a wing, which device may be deflected downward for the purpose of increasing the lift coefficient of the wing. In the case of aircraft 10 of the present specification, the term "flap" is used to describe a peripheral aerodynamic control surface which may be deflected either upward or downward to alter the lift coefficient of lifting surface 14. Flaps 98 may be deflected in unison, or deflected around only a portion of the periphery of lifting surface 14, to increase or decrease the lift coefficient of that portion of lifting surface 14 to which they are applied.

Peripheral flaps 98 are preferably comprised of an inner portion 100 and an outer portion 102, shown in greater detail in FIG. 8. By providing a double flap arrangement some greater efficiency is achieved, although it will be apparent to those skilled in the art that alternative arrangements may be acceptable. Inner flap 100 is secured to the periphery of lifting surface 14 at inner hinge 104, while outer flap 102 is attached to inner flap 100 by means of outer hinge 106. Inner and outer flaps 100 and 102 may be respectively actuated by hydraulic actuators 108 and 110, or by other suitable alternative means.

As forward speed is gained as described above, landing gear 82 may be retracted within the lower portion 78 of central compartment 12 and the aircraft 10 operated as described above and controlled and maneuvered by means of peripheral flaps 98. When slower forward speed is desired, as in approaching for a landing, the above described procedures may be essentially reversed in order to exchange the aerodynamic lift provided by lifting surface 12, for the lift provided by lifting fans 24, 26 and 28. Landing gear 82 may be extended, and aircraft 10 may be caused to descend essentially vertically and landed at any suitable location of sufficient size to contain the span of lifting surface 14.

The embodiment disclosed in FIG. 2, showing an aircraft 18 with an additional peripheral passenger or cargo compartment 20 may be operated in much the same manner as aircraft 10 described above, with the exception of the peripheral flight controls or flaps 98. In lieu of peripheral flaps 98, rearward flight controls 22 are provided when aircraft 18 has gained sufficient forward speed for their use. Flight controls 22 may be operated hydraulically as generally described above and known in the art, or by other suitable means. It will be apparent from the foregoing that aircraft 18 may be maneuvered and operated in flight in much the same manner as that described in detail for aircraft 10, including vertical maneuvering for achieving takeoffs and landings in a limited area.

It is to be understood that the present invention is not limited to the sole embodiment described above, but encompasses any and all embodiments within the scope of the following claims.

I claim:

1. A disc planform aircraft having vertical flight capability,
    said aircraft having a plurality of concentric lifting fan blade sets positioned around a central cabin area and an upper and a lower surface respectively containing upper and lower lifting fans,
    said fan blade sets comprising a first set and a second set,
    said first fan blade set comprises upper and lower inner lift fans and upper and lower outer lift fans and said second fan blade set comprises an upper and lower central lift fan,
    said first set and said second set having equal projected horizontal areas and rotating in opposite directions to one another,
    at least one engine providing power for said aircraft, at least one of said at least one engine providing power for the operation of said fan blade sets, and
    means providing power transmission from said at least one of said at least one engine to said fan blade sets.

2. The aircraft of claim 1 wherein;
each said first and said second lifting fan blade set includes a plurality of upper and lower lifting fan blades.

3. The aircraft of claim 1 wherein;
said engine include one said engine providing power for said lifting fan blade sets.

4. The aircraft of claim 3 including;
two additional engines providing power for horizontal flight.

5. The aircraft of claim 1 including;
peripheral aerodynamic control means providing for control of said aircraft in flight.

6. The aircraft of claim 5 wherein;
said peripheral aerodynamic control means comprise a plurality of first and second control surfaces,
said first control surfaces each having an inner edge and an outer edge,
each said first control surface inner edge hingedly attached to the periphery of said aircraft,
said second control surfaces each having an inner and an outer edge,
each said second control surface inner edge hingedly attached to a said first control surface outer edge.

7. The aircraft of claim 1 including;
a structure comprised of a plurality of horizontal radial members in compression in combination with a plurality of upper and lower radial members in tension.

8. The aircraft of claim 7 wherein;
said radial compression members are hollow.

9. The aircraft of claim 1 wherein;
said power transmission means comprise a plurality of radial transmission shafts from said engine providing said fan blade power to a plurality of fan drive mechanisms, and
said fan drive mechanisms providing power to said lift fan blades.

10. The aircraft of claim 9 wherein;
said lift fan blades each have a peripheral annular fan guide extending vertically therefrom,
each said fan drive mechanism including a plurality of bearing means,
said bearing means providing for the containment of said annular fan guides and associated operative forces.

11. The aircraft of claim 9 wherein;
said radial transmission shafts are contained within said radial compression members.

12. The aircraft of claim 1 including;
a peripheral cabin area providing space for the carriage of payload.

13. The aircraft of claim 12 including;
aerodynamic controls rearwardly located on said aircraft.

14. The aircraft of claim 1 wherein;
said upper and lower surfaces each include a plurality of vane means,
said vane means providing openings for the passage of air therethrough.

15. The aircraft of claim 14 wherein;
said openings of said vane means are controllably variable.

* * * * *